United States Patent [19]
Molzon

[11] 3,944,283
[45] Mar. 16, 1976

[54] WALL MOUNTED SIDE FACING SEAT FOR TRANSIT VEHICLE

[75] Inventor: William R. Molzon, Rancho Palos Verdes, Calif.

[73] Assignee: Rohr Industries, Inc., Chula Vista, Calif.

[22] Filed: Mar. 14, 1975

[21] Appl. No.: 558,462

[52] U.S. Cl. .................. 297/454; 296/63; 297/450
[51] Int. Cl.² .......................................... A47C 7/02
[58] Field of Search ........ 296/63, 64; 297/421, 457, 297/450, 451, 454, DIG. 2

[56] References Cited
UNITED STATES PATENTS

| | | | |
|---|---|---|---|
| 3,625,565 | 12/1971 | Barecki.............................. | 297/450 |
| 3,797,887 | 3/1974 | Barecki et al...................... | 297/454 |

*Primary Examiner*—James C. Mitchell
*Attorney, Agent, or Firm*—Patrick J. Schlesinger

[57] ABSTRACT

A wall-mounted, side facing seat for a transit vehicle comprises a cantilever mounted support frame consisting of a pair of end members with marginal flanges, and a stretcher interconnecting the lower portions of the free ends of the frame end members. A seat insert formed of sheet material with integral end portions and conforming marginal flanges fits between the frame end members and is supported by the frame. Angle channel members receive and retain conforming flange portions of the frame and insert, while an insert back portion slopes downwardly and rearwardly from the upper edge of an insert back portion to the vehicle wall to provide clearance from, and access to, a vehicle window in back of the seat.

13 Claims, 5 Drawing Figures

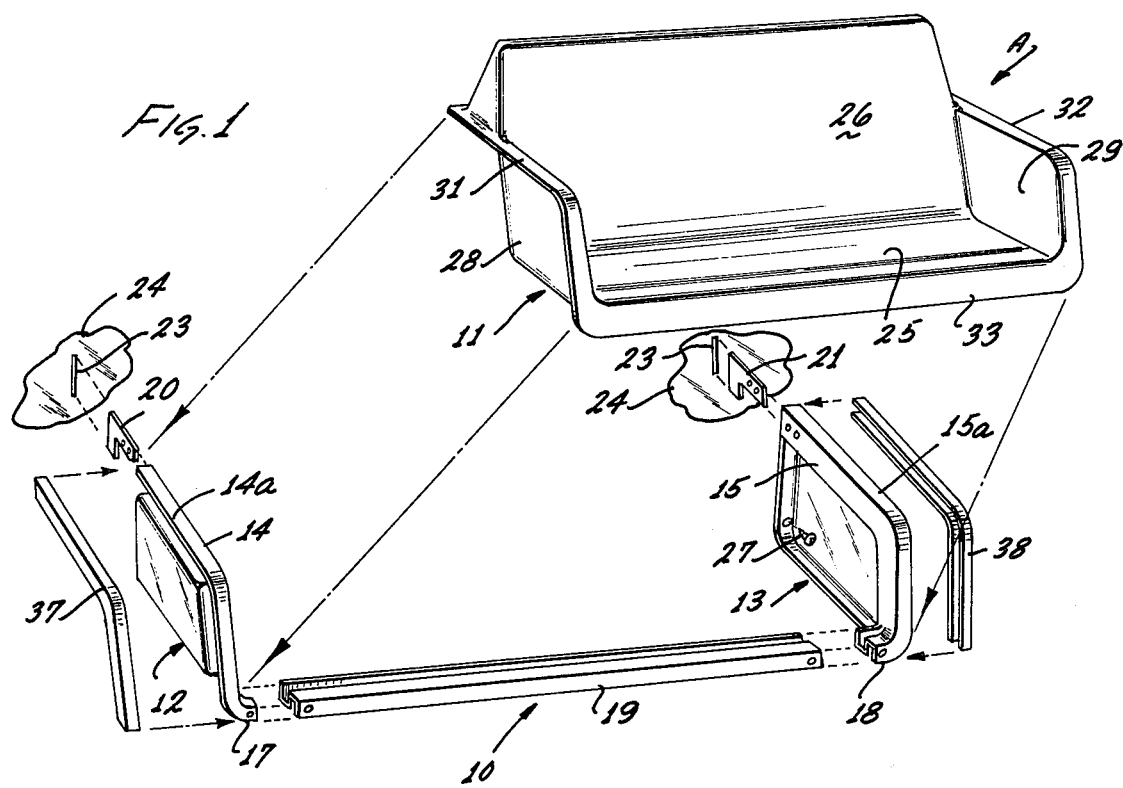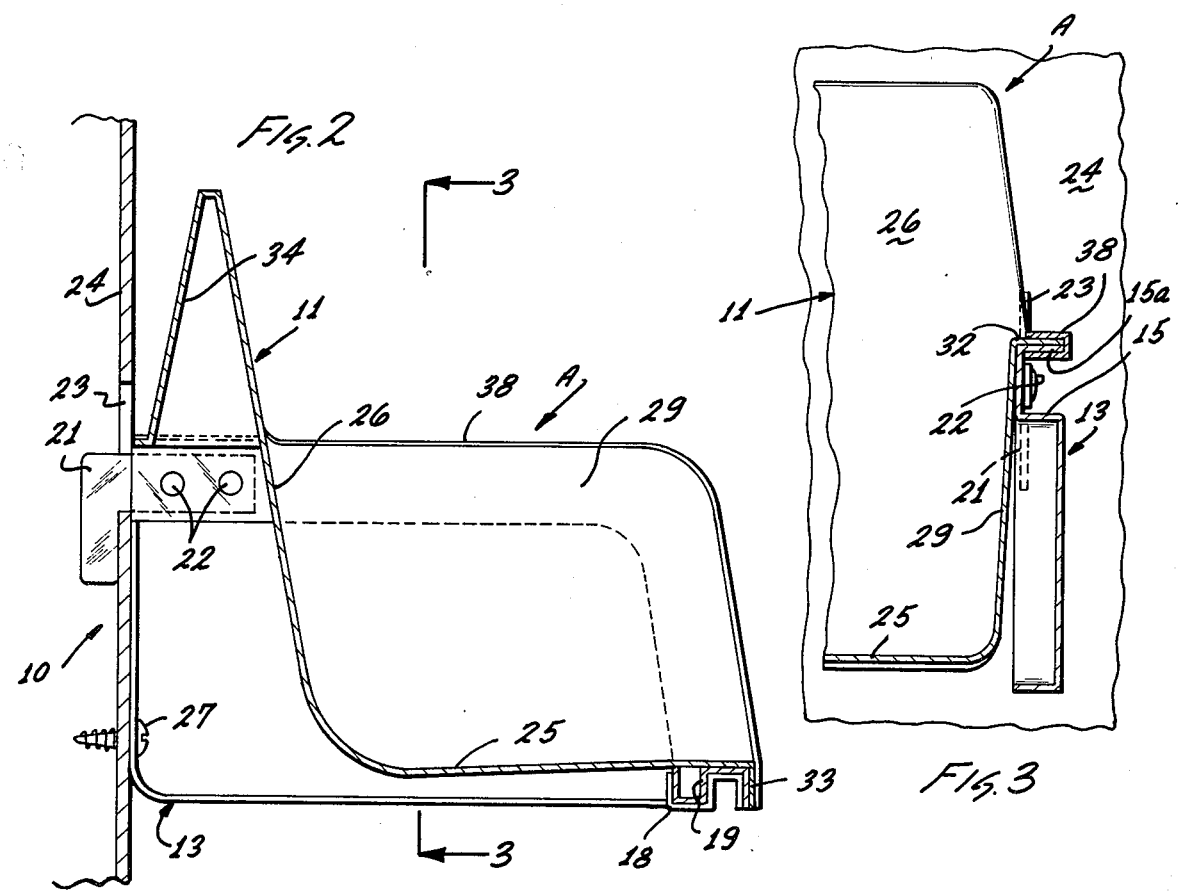

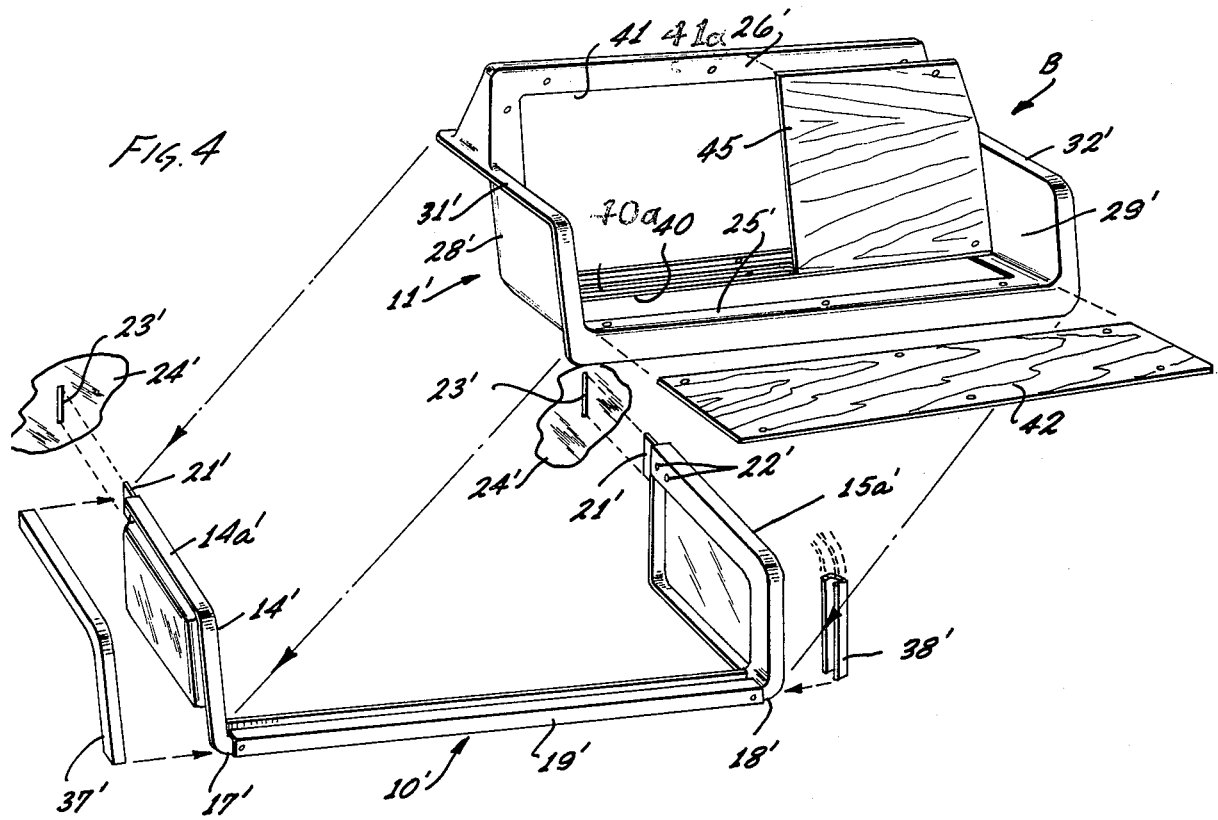
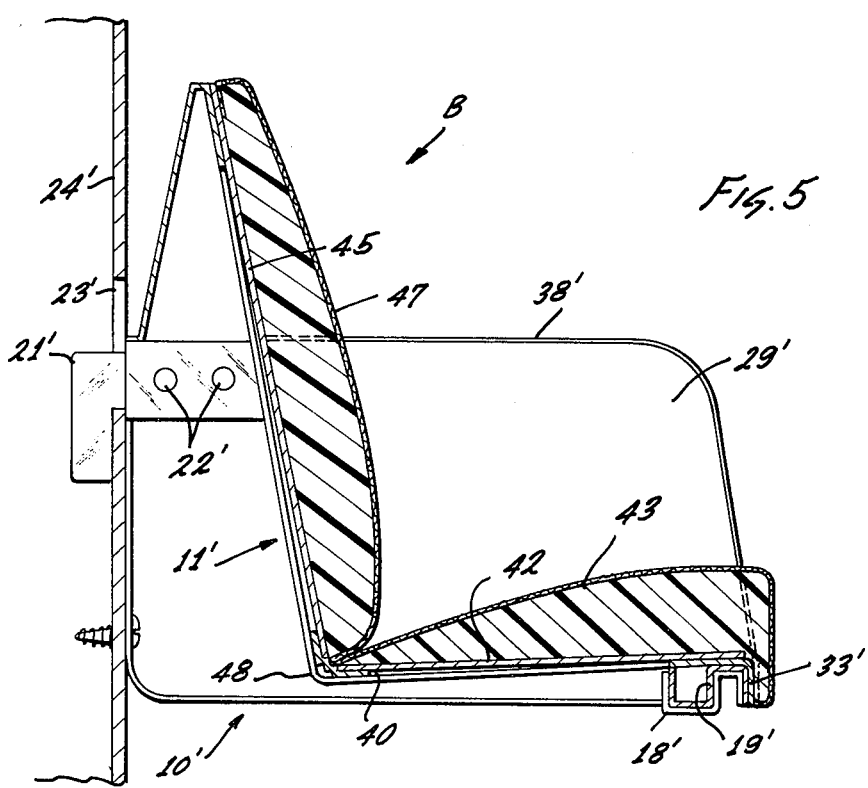

WALL MOUNTED SIDE FACING SEAT FOR TRANSIT VEHICLE

BACKGROUND OF THE INVENTION

In transit vehicles, such as some buses and rail cars, it is customary to provide at least a few side mounted seats, for example, in the wheel well areas of such vehicle, and it is desirable to have such seats cantilever mounted in order to facilitate cleaning under the seats. The seats of such vehicles are subject to damage by pranksters and vandals, and it is therefore desirable to have the seats resistant to such damage, and to have them easily replaceable when they are damaged.

SUMMARY OF THE INVENTION

The present invention comprises a two-part seat structure wherein a support frame is cantilever mounted to a side wall of a transit vehicle, and a seat insert fits into, and is supported by, the frame. The seat insert preferably is molded or formed in one piece from suitable material. The back portion of the seat insert extends to a height well above the lower edge of a window opening in the vehicle wall which supports the frame, and slopes from its high point downwardly and outwardly toward the wall, and terminates at the wall just below such window opening.

BRIEF DESCRIPTION OF THE DRAWINGS

The objectives and advantages of the present invention will be apparent from the following description and the accompanying drawings, wherein:

FIG. 1 is an exploded, perspective view of a seat embodying the invention, principal elements of the supporting frame being separated, and the seat insert projected upwardly and to the right from its normal position within the frame.

FIG. 2 is a somewhat enlarged, vertical cross-sectional view of the seat shown in FIG. 1 as it appears when assembled and cantilever mounted on the side wall of a transit vehicle.

FIG. 3 is a fragmentary, sectional view taken along line 3—3 of FIG. 2.

FIGS. 4 and 5, respectively, are views generally similar to FIGS. 1 and 2, but showing a modified form of the invention.

DETAILED DESCRIPTION OF THE INVENTION

Referring to the drawings in detail, a side mounted cantilever seat A, shown in FIGS. 1–3 and embodying the present invention, comprises a cantilever mounted frame 10 and a one-piece seat insert 11 fitted into the supported by the frame. The latter comprises two similar, but reversed, generally rectangular, pan type end members 12 and 13 of suitable sheet material, for example, plastic, sheet metal or fiberglass, with angle channel portions 14 and 15 extending, respectively, along the upper edge and outer end of the frame end members. Lower end portions 17 and 18, respectively, of the upright front portions of the angle channel portions 14 and 15 extend inwardly toward each other as shown in FIG. 1, and are formed to rectangular "S" cross-sectional shape as best shown in FIG. 2. A transversely extending stretcher 19 also formed to rectangular "S" cross-sectional shape is fitted onto the inturned portions 17 and 18, and is secured thereto by suitable means, such as welding, or rivets.

Lower rear portions of the frame end members 12 and 13 bear on the vehicle side wall 24, and a pair of flat, hook shaped mounting tabs 20 and 21, are secured, respectively, to upper rear portions of the frame end members 12 and 13. These mounting tabs are shaped and located to enter slotted openings 23 provided in the side wall 24 of a transit vehicle in which the seat is mounted, and have hooked engagement with the wall 24 to provide cantilever support for the frame 10. A self-tapping screw 27, see FIG. 2, screwed into aligned holes in the wall 24 and each frame end member 12 and 13 anchors the frame against removal.

The insert 11 is an integral, one piece member of suitable sheet material, for example, fiberglass, plastic, or sheet metal. Suitable procedures for molding or forming such inserts are well known, and the details thereof, therefore, need not be set forth herein. The seat insert 11 comprises a generally horizontal seat portion 25 a generally upright back portion 26, and end portions 28 and 29.

The latter are shaped to fit between the frame end members 12 and 13, and are provided with out-turned side flanges 31 and 32, respectively, which overlie and conform to the outer flanges 14a and 15a, respectively, of the frame end member angle channels 14 and 15. The forward portion of the insert seat portion 25 rests on the stretcher 19, and a down-turned front edge flange 33 of the seat portion 25 comprises a continuation of the insert side flanges 31 and 32, and fits over and masks the stretcher 19.

The insert back portion 26 is disposed at a selected seating angle with respect to the seat portion 25, and extends to a height above the lower edge of a vehicle side window 34 in front of which the seat A is mounted. The upper edge of the insert back portion 26 is spaced from the vehicle side wall 24, and from this upper edge an angularly downwardly and outwardly sloping portion 34 extends below the window approximately to the level of the insert side flanges 31 and 32, and thence outwardly to the wall 24.

A pair of angularly bent retainer channels 37 and 38 fit onto and receive, respectively, the angle channel flanges 14a and 15a and the seat insert side flanges 31 and 32 which, respectively, are in close, conforming relation therewith. These retainer channels conceal the laterally out-turned edges of the seat frame and insert, and secure the insert 11 to the support frame 10. The retainer channels 37 and 38 fit snugly onto their respective superposed flanges to grip them firmly, but if additional holding strength is required the retainer channels may be secured in position by suitable means, such as, for example, a suitable adhesive or rivets.

OPERATION OF THE FORM OF THE INVENTION ILLUSTRATED IN FIGS. 1–3

Assume that the support frame 10 is assembled as shown in FIGS. 2–5 and is mounted to the vehicle side wall 24 with the mounting tabs 20 and 21 inserted in their respective slotted openings 23, and the frame lowered to have hooked, cantilever supported engagement with the vehicle wall 24. A screw 27 is screwed into aligned holes drilled in each frame end member and in the supporting wall 24 to anchor the frame in position. The seat insert 11 is then fitted into the frame 10 between the frame end members 12 and 13 so that the insert side flanges 31 and 32 conform respectively to the angle channel outer flanges 14a and 15a.

The retaining channels 37 and 38 are then fitted, respectively, onto the insert side flanges 31 and 32 and their respective frame angle flanges 14a and 15a as best shown in FIG. 3. The seat A is thereupon ready for use, and remains firmly in position until it is desired either to remove it, or to remove and replace the insert 11, either of which operations may be performed by reversing selected portions of the procedure described previously herein for the mounting of the seat on a wall.

MODIFIED FORM SHOWN IN FIGS. 4 AND 5

The modified form of the invention shown in FIGS. 4 and 5 comprises a seat B, which is generally similar to the seat A shown in FIGS. 1–3. The frames of the two seats are identical, while the inserts of the two seats are in general quite similar to each other. The parts of seat B which correspond to those of seat A are, therefore, designated by similar reference numerals with the prime (') added.

A generally rectangular opening 40 is provided in the insert seat portion 25', and a second, generally similar opening 41 is also provided in the insert back portion 26', so that the insert portions surrounding these openings comprise marginal frame portions 40a and 41a, respectively. A panel 42 of plywood or other suitable material, and with suitable upholstery 43 applied thereto, is provided of a size and shape to cover the opening 40 for support by the marginal frame portion 40a, to which it may be releasably attached by suitable fastening means, for example, screws. A second plywood panel 45, similarly upholstered as at 47, is also mounted to cover the opening 41 for support by the marginal frame portion 41a to which it is similarly releasably attached.

The upholstery with which the panels 42 and 43 are provided may comprise suitable protective or cushioning material, such as foam backed carpet or resilient plastic foam, either of self-skinning type or covered with suitable sheet plastic, fabric, or other upholstery material in accordance with sound upholstering practice. The upholstered panels 42 and 45 are simpler, less expensive, and more easily replaced if damaged than would be conventional covering or upholstery applied to the seat insert A shown in FIGS. 1–3.

Other than the provision of the openings 40 and 41 covered by the panels 42 and 45, and the formation of the seat and back portions of the insert B of FIGS. 4 and 5 with a straight line angle 48 therebetween instead of the curvature shown in FIGS. 1 and 3, the two forms of the invention are generally similar. The operation of the form shown in FIGS. 4 and 5 will, therefore, be apparent to one having read and understood the preceding description of the operation of the form of the invention shown in FIGS. 1–3.

The invention provides a side mounted cantilever seat for a transit vehicle, which seat is simple and economical to make and install, comfortable, light weight, strong, of good appearance, resistant to damage, and easily replaced either in whole or in part.

Having thus described the invention, what is claimed as new and useful and desired to be secured by U.S. Letters Patent is:

1. A side facing, cantilever seat for a transit vehicle comprising:
   a seat frame comprising a pair of end members in opposed, spaced apart relation, at least a lower rear portion of each frame end member bearing on a side wall of such vehicle,
   means releasably securing an upper rear portion of each frame end member to such vehicle side wall for cantilever support of the seat frame,
   a stretcher extending between, and secured to, the lower front portions of the two frame end members,
   an integral, one piece seat insert of sheet material fitted into the frame and supported thereby, said insert comprising,
   a generally horizontal seat portion and a generally upright back portion defining therebetween a selected seating angle, said seat insert having an integral end portion on each end thereof, said insert end portions fitting between the frame end members with a forward edge portion of the insert seat portion resting on, and supported by, the stretcher.

2. A seat for a transit vehicle as claimed in claim 1 wherein an endwise extending flange is provided on each insert end portion, each of said endwise extending flanges fitting in supported relation over, and masking, at least an upper edge portion of one of the frame end members.

3. A seat for a transit vehicle as claimed in claim 2 wherein the endwise extending flanges on the insert end portions extend also along the front edges of the insert end portions, and a flange, continuous with the endwise extending insert flanges, extends downwardly along the forward edge of the seat insert, masking the stretcher.

4. A seat for a transit vehicle as claimed in claim 3 wherein each frame end member is of shallow pan shape with an integral, outwardly open channel formed along the upper and forward edges thereof.

5. A seat for a transit vehicle as claimed in claim 4 wherein each endwise extending insert flange is substantially co-extensive with, and closely superposed with respect to, a flange defining the outer side of the channel extending along the upper and forward edges of each frame end member, and a retaining channel of sheet material is fitted in close, conforming relation onto the relatively superposed flanges on each end of the assembled frame and insert to cover and conceal the otherwise exposed endwise directed edges of such superposed flanges, and to retain the seat insert in the frame.

6. A seat for a transit vehicle as claimed in claim 1 wherein a laterally inwardly extending portion is provided on the lower front portion of each frame end member, and the stretcher is fitted onto and supported by such inwardly extending portions.

7. A seat for a transit vehicle as claimed in claim 6 wherein the inwardly extending portions of the frame end members are of rectangular "S" cross-sectional shape, as is also the stretcher.

8. A seat for a transit vehicle as claimed in claim 7 wherein the seat is mounted inwardly of a window in such vehicle side wall, the upper edge of the insert back portion extends above the lower edge of such window and is spaced from such side wall, and a portion of the seat insert slopes from the upper edge of the insert back portion outwardly and downwardly toward such vehicle wall.

9. A seat for a transit vehicle as claimed in claim 8 wherein the downwardly and outwardly sloping portion of the insert terminates in a portion extending to such vehicle side wall below the lower edge of such window.

10. A seat for a transit vehicle as claimed in claim 1 wherein the insert seat portion comprises a marginal frame portion, and an upholstered seat member is fitted onto, and is wholly supported marginally thereof by, said marginal frame portion.

11. A seat for a transit vehicle as claimed in claim 10 wherein the insert back portion also is provided with a marginal frame portion, and an upholstered seat member is fitted onto, and is wholly supported marginally thereof by, the marginal frame portion of the insert back portion, and is releasably secured thereto.

12. A seat for a transit vehicle as claimed in claim 1 wherein the insert seat portion and the insert back portion are each substantially flat, each has an opening therein extending throughout a major central portion thereof, and an upholstered seat member covers each of the openings in the insert seat portion and in the insert back portion, at least the upholstered seat member covering the opening in the insert back portion being releasably secured to the insert.

13. A seat for a transit vehicle as claimed in claim 1 wherein fastening means releasably secures the seat frame to such vehicle side wall.

* * * * *